July 4, 1961

A. VANWERSCH ET AL 2,991,097

CONNECTING STRUCTURE FOR BEAMS OF
A ROOF SUPPORT OR THE LIKE

Filed May 23, 1955

Inventors:
Aloys Vanwersch,
Peter Vanwersch, and Ludwig Vanwersch

By: Michael S. Striker agt.

Inventors:
Aloys Vanwersch,
Peter Vanwersch, and Ludwig Vanwersch
By: Michael S. Striker

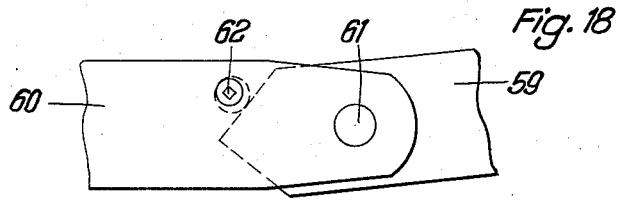
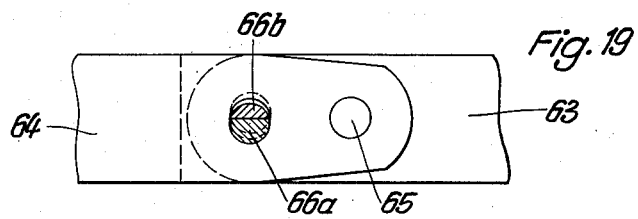
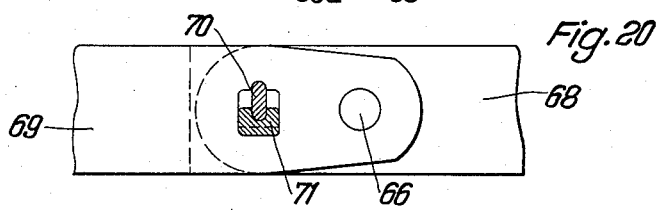
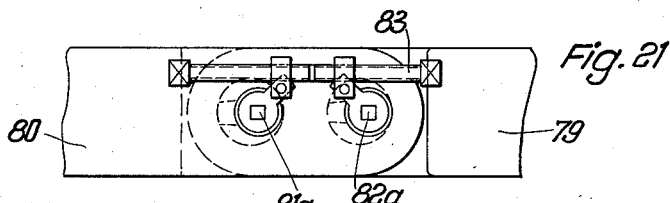
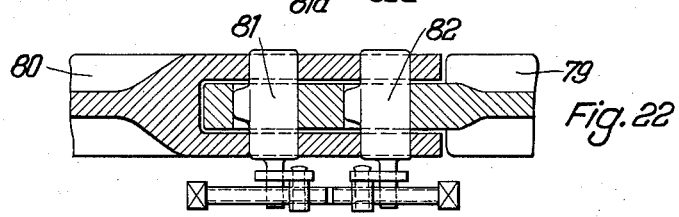
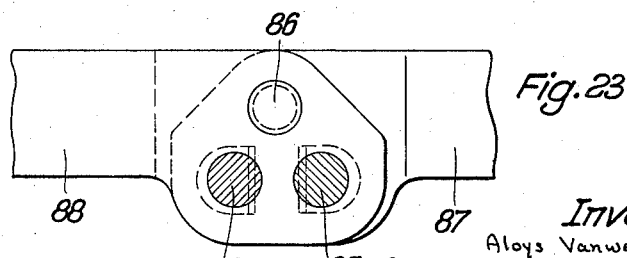

July 4, 1961

A. VANWERSCH ET AL 2,991,097

CONNECTING STRUCTURE FOR BEAMS OF
A ROOF SUPPORT OR THE LIKE

Filed May 23, 1955

Inventors
Aloys Vanwersch,
Peter Vanwersch and Ludwig Vanwersch
By: Michael S. Striker
agt.

July 4, 1961 A. VANWERSCH ET AL 2,991,097
CONNECTING STRUCTURE FOR BEAMS OF
A ROOF SUPPORT OR THE LIKE
Filed May 23, 1955 6 Sheets-Sheet 6

Inventors
Aloys Vanwersch,
Peter Vanwersch and Ludwig Vanwersch
By: Michael S. Striker
agt.

United States Patent Office 2,991,097
Patented July 4, 1961

2,991,097
CONNECTING STRUCTURE FOR BEAMS OF A ROOF SUPPORT OR THE LIKE
Aloys Vanwersch, Heiderweg 7, Angermund, Bezirk Dusseldorf, Germany; Peter Vanwersch, Kleinmarschierstrasse 1, Aachen, Germany; and Ludwig Vanwersch, Reuleauxstrasse 16, Eschweiler, near Aachen, Germany
Filed May 23, 1955, Ser. No. 510,204
In France July 8, 1948
Public Law 619, Aug. 23, 1954
Patent expires July 8, 1968
7 Claims. (Cl. 287—99)

The present invention relates to supporting structures particularly of the type used to support the roof of a mine shaft or the like.

Particular problems are involved in supports of the above type because, on the one hand, they must be robust enough to withstand great forces and because, on the other hand, they must be flexible enough to conform to whatever shape the roof of the mine shaft or the like happens to take.

One of the objects of the present invention is to solve the above problems by providing connections between a plurality of beams which lend to the connected beams sufficient flexibility to conform to a given roof shape and which also lock the beams together in such a way that they provide an extremely strong support.

Another object of the present invention is to provide a beam connecting structure of the above type which is exceedingly simple and which prevents angular displacement of a pair of beams with respect to each other in either direction.

Furthermore, it is an object of the present invention to provide an beam arrangement of the above type which may be disassembled whenever desired to have the beams reversed, for example.

Also, it is an object of the present invention to provide a beam adjusting structure which in addition to adjusting the angle between a pair of successive beams serves also to lock the beams in their adjusted position.

With the above objects in view, the present invention mainly consists of a supporting structure which includes a first beam having a bifurcated end portion provided with a pair of spaced walls each of which is formed with openings, the openings of one wall being aligned with those of the other wall wall. A second beam has an end portion extending between the spaced walls of the first beam and formed with openings aligned with those of the spaced walls. A pivot pin extends through one set of aligned openings so that the first and second beams are turnable with respect to each other to a desired angular position, and one or more elongated wedge members extend through the other set of aligned openings for locking the beams in a given angular position as well as for turning the beams to the desired angular position.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

FIG. 18 is a fragmentary side elevational view of a further embodiment of the present invention;

FIG. 19 is a fragmentary side elevational view of a further embodiment of the present invention;

FIG. 20 is a fragmentary side elevational view of a still further embodiment of the present invention;

FIG. 21 is a fragmentary side elevational view of yet another embodiment of the present invention;

FIG. 22 is a sectional plan view of the structure of FIG. 1 taken along a plane midway between the top and bottom of FIG. 21;

FIG. 23 is a fragmentary side elevational view of a still further embodiment of the present invention;

Figure 1:
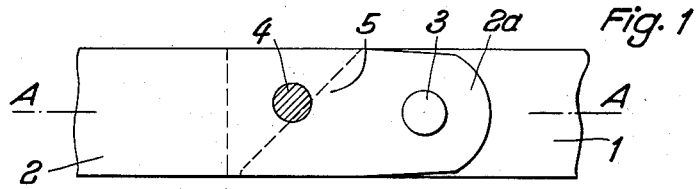
FIG. 1 is a fragmentary side elevational view illustrating one possible manner of interconnecting a pair of beams.
Figure 2:
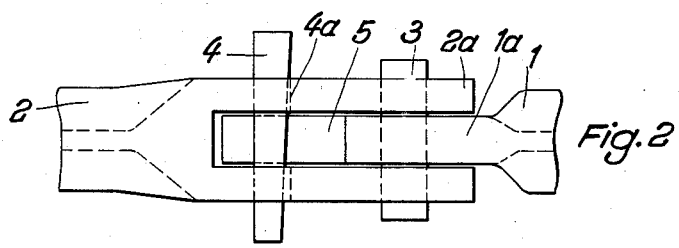
FIG. 2 is a top plan view of the structure of FIG. 1.

Referring now to the drawings, it will be seen that the beam 2 of FIGS. 1 and 2 has a bifurcated end portion 2a provided with a pair of spaced walls between which the end portion 1a of the beam 1 freely extends. The beams 1 and 2 are supported in a known way by suitable props not shown in the drawings and serving to hold the beams against the roof of a mine shaft or the like. This is true of all of the embodiments of the invention. The walls of end portion 2a and the end portion 1a are respectively formed with openings which are aligned and through which a pivot pin 3 extends so that in this way the beams 1 and 2 are pivotally connected for angular movement with respect to each other. Through such angular movement of the beams it is possible to arrange them so that they correspond to the contour of a particular roof to be supported. The walls of bifurcated end portion 2a of beam 2 are furthermore formed with a pair of aligned openings 4a, respectively, through which an elongated wedge member 4 extends, and this wedge member 4 engages the inclined end face 5 of the beam 1. In the adjusted angular position the wedge member 4 is moved along its axis so as to abut against the end face 5 in order to maintain the beams in the desired angular position. The end face 5 of beam 1 preferably makes an angle of between 40 and 60° with the axis A—A of the beams indicated in FIG. 1. The wedge member 4 may have a circular cross section but preferably may also have a flat face on one side to engage the surface 5.

Figure 3:
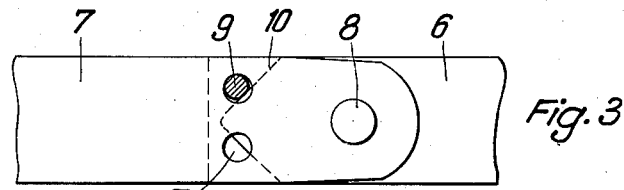
FIG. 3 is a fragmentary side elevational view of a different embodiment.

FIG. 3 shows an embodiment where the beam 7 is provided with a bifurcated end portion having spaced walls between which an end portion of the beam 6 extends, this beam 6 and the spaced walls at the end of beam 7 being formed with aligned openings which receive the pivot pin 8. The end face of beam 6 shown in FIG. 3 is substantially V-shaped to provide a pair of inclined end faces 10 against which a wedge member 9 is located to maintain the beams in their adjusted position, this wedge member 9 extending through either one of two pairs of aligned openings respectively formed in the spaced side walls of the bifurcated end portion of the beam 7, as indicated in FIG. 3. With the position of the parts shown in FIG. 3 where the wedge member 9 is located in the upper openings 7a the beam 6 is prevented from turning downwardly, and if the wedge member 9 is located in the lower pair of openings 7a and engages the inclined face 10 which extends across these lower openings then the beam 6 will be prevented from turning upwardly. Because of the wedge shape of the wedge members 9 of FIG. 3 and 4 of FIGS. 1 and 2 these wedge members may be used to tilt the beams with respect to each other, if desired. It is also possible with the embodiment of FIG. 3 to insert wedge members in both pairs of openings 7a so as to prevent turning of beams 6 and 7 with respect to each other in either direction. The arrangement of the structure shown in the several embodiments of the invention is preferably such that the top face of the interconnected beams have no projections.

Figure 4:
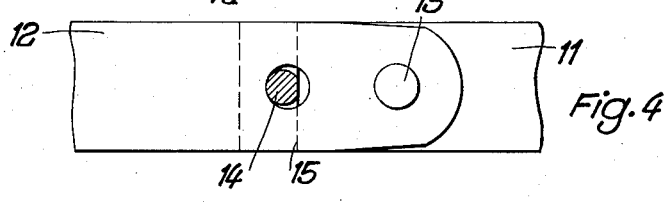
FIG. 4 is a fragmentary side elevational view of another embodiment.

With the embodiment of the invention shown in FIG. 4 the end face 15 of beam 11 which is engaged by the wedge member 14 makes an angle of approximately 90° with the axis of the beam 11. The latter beam has an end portion extending into the space between a pair of spaced walls of the bifurcated end portion of beam 12, these spaced walls and the beam 11 being formed with aligned openings which receive the pivot pin 13. The wedge member 14 extends through a pair of aligned openings of the spaced walls at the end of beam 12 in order to engage the end face 15 of beam 11 in the manner indicated in FIG. 4.

Figure 5:
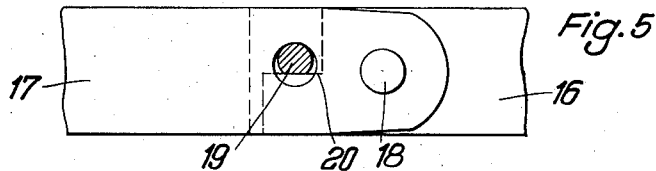
FIG. 5 is a fragmentary side elevational view of another embodiment of the invention.
Figure 6:
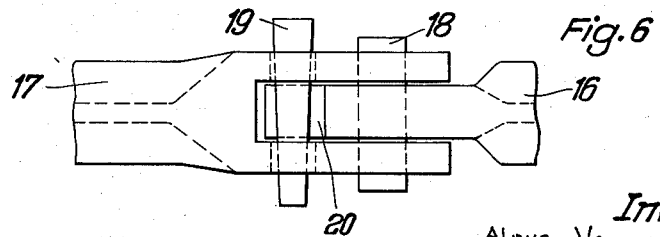
FIG. 6 is a top plan view of the structure of FIG. 5.

With the above-described embodiments of the invention it is possible for the wedge member and the face engaging the same to slip to some extent with respect to each other so that the above-described embodiments are somewhat yieldable. In order to eliminate such yieldability an embodiment as shown in FIGS. 5 and 6 may be used. As illustrated in FIGS. 5 and 6 the beam 17 is provided with a bifurcated end portion having a pair of spaced walls between which an end portion of the beam 16 extends, these spaced walls and the beam 16 being formed with aligned openings, respectively, which receive the pivot pin 18. The end face 20 of the beam 16 is stepped so as to provide a surface portion extending substantially along the axis of the beam 16, and the wedge member 19 extends through a pair of aligned openings respectively formed in the spaced walls of beam 17 and engages the end face 20 in the manner indicated in FIGS. 5 and 6 to prevent downward turning of beam 16 with respect to beam 17.

Figure 7:
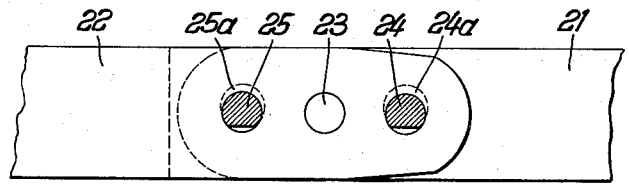
FIG. 7 is a fragmentary side elevational view of still another embodiment of the present invention.

According to the embodiment shown in FIG. 7 the beam 22 is provided with a bifurcated end portion having spaced walls between which an end portion of the beam 21 extends, these spaced walls and beam 21 being formed respectively with aligned openings to receive the pivot pin 23. These spaced walls of beam 22 and the beam 21 are also formed on one side of pivot pin 23 respectively with three aligned openings 24a and on the opposite side of pin 23 with three aligned openings 25a, an elongated wedge member 24 extending through the aligned openings 24a and the elongated wedge member 25 extending through the aligned openings 25a. As indicated in FIG. 7 the openings 24a and 25a of beam 21 are slightly larger than the corresponding openings of beam 22. With this embodiment the wedge members 24 and 25 lock the beams 21 and 22 against turning movement with respect to each other in either direction.

With the above-described embodiments the beams are directly interconnected and transfer forces directly between each other through the wedge members. Where a roof has portions which make relatively sharp angles with respect to each other and with which the contour of the beams must conform, it is desirable to provide a special connecting structure between the pair of beams which enables the angle therebetween to be more pronounced than with the above-described embodiments. This connecting member may have bifurcated ends which respectively receive the ends of the beams or the latter may have bifurcated ends which respectively receive the ends of the connecting member. For manufacturing purposes the arrangement where the connecting member has bifurcated ends is generally preferred.

Figure 8:
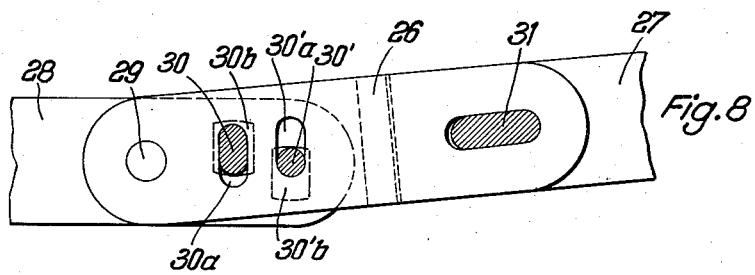
FIG. 8 is a fragmentary side elevational view of a further embodiment of the present invention.
Figure 9:
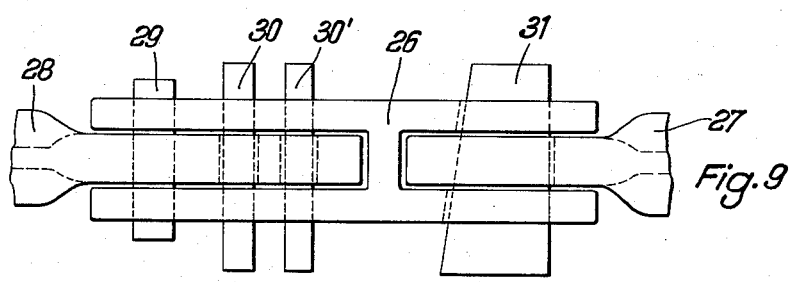
FIG. 9 is a top plan view of the structure of FIG. 8.

Referring to FIGS. 8 and 9 it will be seen that the elongated connecting member 26 has a pair of bifurcated ends which respectively receive the ends of the beams or elongated members 27 and 28. The spaced walls of the right bifurcated end of connecting member 26 are formed with a pair of elongated openings aligned with an elongated opening formed in the beam 27, and a wedge member 31 extends through all of these latter openings so that the beam 27 is rigidly connected to the connecting member 26. The left bifurcated end of connecting member 26, as viewed in FIGS. 8 and 9, has its spaced walls formed with a pair of openings aligned with an opening of beam 28, and these latter aligned openings receive a pivot pin 29. The spaced side walls of the left end portion of member 26 are further each formed with a pair of openings 30a and 30'a which are elongated, which extend transversely to the beams, and which are staggered with respect to each other in the manner shown in FIG. 8. The beam 28 is formed with a pair of elongated openings 30b and 30'b which also are staggered with respect to each other, and it will be noted that the staggering of these latter openings of beam 28 is reversed with respect to the staggering of the openings 30a and 30'a of member 26. An elongated wedge member 30 extends through openings 30a and 30b in the manner indicated in FIG. 8 to limit upward turning of beam 28 with respect to member 26, while a wedge member 30' extends through openings 30'a and 30'b to prevent downward turning of beam 28.

It will be noted that with this embodiment of the invention the beams 27 and 28 are very simply constructed since their ends need not be bifurcated. In fact, both ends of each beam may be identically constructed in order to reduce manufacturing costs. Of course, the wedge member 30' and openings 30'a and 30'b may be eliminated, if desired.

Furthermore, the connection at 29 and 30 between beam 28 and member 26 may also be used to interconnect beam 27 and member 26, if desired. With such an arrangement both beams are turnable with respect to the connecting member.

Figure 10:
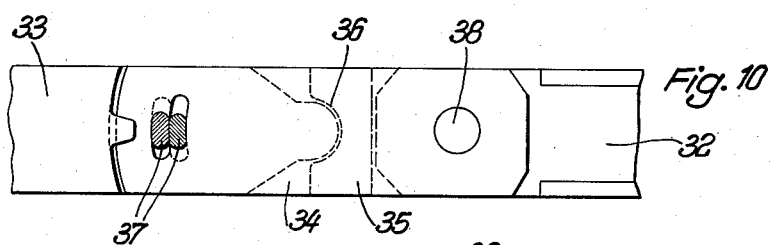
FIG. 10 is a fragmentary side elevational view of a further embodiment of the present invention.
Figure 11:
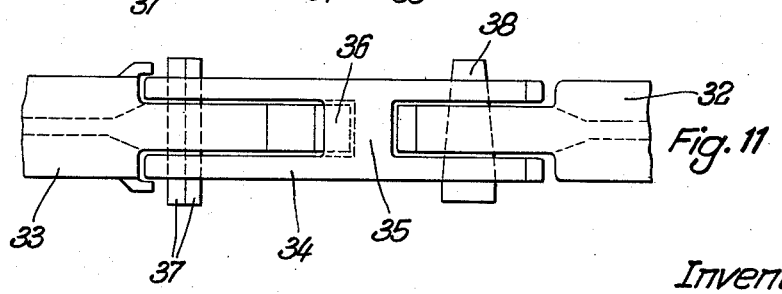
FIG. 11 is at top plan view of the structure of FIG. 10.

The embodiment of FIGS. 10 and 11 is similar to that of FIGS. 8 and 9 in that it includes an elongated connecting member 35 having a pair of bifurcated ends which receive the ends of the beams or elongated members 32 and 33, beam 32 being formed with an opening aligned with openings respectively formed in the right bifurcated end of member 35 and these aligned openings receiving a wedge member 38 to interconnect beam 32 with the connecting member 35. The embodiments of FIGS. 10 and 11 differs from that of FIGS. 8 and 9 principally in that the pivot pin 29 is omitted. Instead, the face of member 35 which extends between the spaced walls of bifurcated end 34 thereof is formed with an arcuate recess 36 receiving an arcuate end of beam 33 so that the latter may turn with respect to the connecting member 35. Furthermore, the spaced side walls of bifurcated end portion 34 of member 35 are each formed with a pair of arcuate openings which are staggered with respect to each other and which communicate with each other in the manner indicated in FIG. 10, and the beam 33 is formed with an identical opening which is, however, reversed with respect to the openings of member 35, as is evident from FIG. 10. A pair of wedge members 37 of substantially oval cross section are in engagement with each other and extend through these openings in the manner indicated in FIGS. 10 and 11 to limit movement of beam 33 with respect to connecting member 35 in both directions. If the recess 36 and the end of beam 33 extending into the same are spherical then the beam 33 may move in all directions with respect to the connecting member 35.

Figure 12:
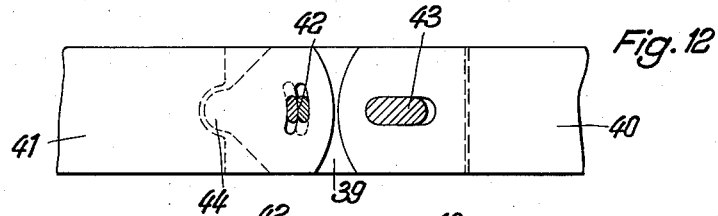
FIG. 12 is a fragmentary side elevational view of a still further embodiment of the present invention.
Figure 13:
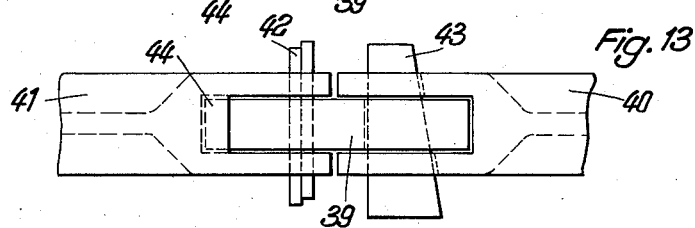
FIG. 13 is a top plan view of the structure of FIG. 12.

The embodiment of FIGS. 12 and 13 differs from that of FIGS. 10 and 11 in that the elongated connecting member 39 is in the form of a simple plate, while the ends of beams or elongated members 41 and 40 are bifurcated to receive the connecting member 39, as indicated in FIGS. 12 and 13. The end face of beam 41 which extends between the spaced walls of its bifurcated end is formed with an arcuate recess 44 for receiving an arcuate end of the plate 39, as indicated in FIGS. 12 and 13, so that in this way beam 41 is turnable with respect to connecting member 39. The spaced walls at the end of beam 41 are formed respectively with openings aligned with an opening of plate 39 to receive the wedge member 43 which thus rigidly interconnects beam 40 with member 39. On the other hand, the spaced walls of beam 42 are formed with openings identical with those in the spaced walls of bifurcated end 34 of connecting member 35 and cooperating with an identically reversed opening of member 39 to receive the wedge members 42 which are identical with wedge members 37 and which cooperate with members 41 and 39 to lock the same with respect to each other in a given angular position in the same ways as with the embodiment of FIGS. 10 and 11.

Figure 14:
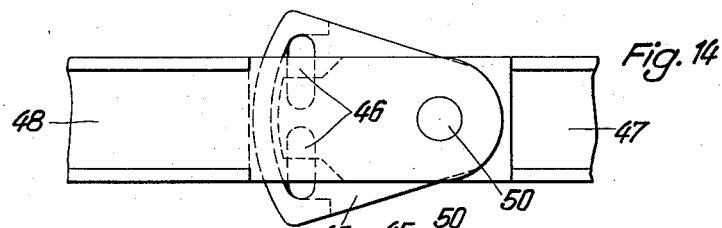
FIG. 14 is a fragmentary side elevational view of another embodiment of the present invention.
Figure 15:
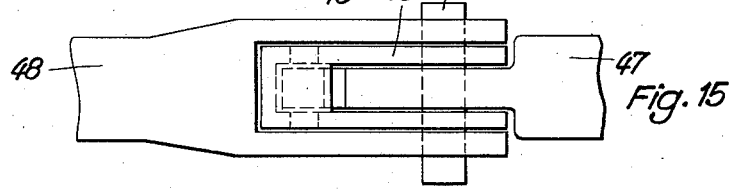
FIG. 15 is a top plan view of the structure of FIG. 14.
Figure 16:
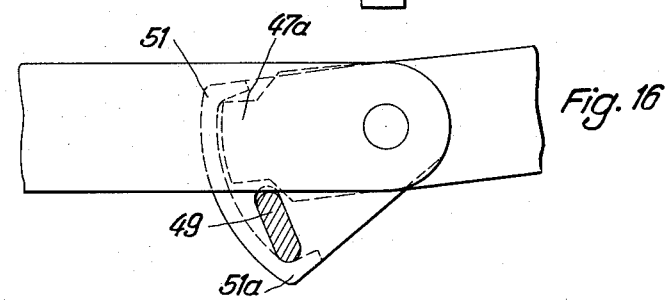
FIG. 16 is a fragmentary side elevational view showing the structure of FIGS. 14 and 15 in an operative position.

It will be noted that with the above embodiments the beams are formed with openings which while being relatively narrow are nevertheless fairly long, and such long openings may be undesirable under some circumstances. In order to eliminate such openings in the beams, an embodiment such as that illustrated in FIGS. 14–16 may be used. According to this embodiment, the beam 48 is provided with a bifurcated end having spaced walls between which an end portion of the beam 47 extends with considerable clearance, as indicated in FIG. 15. A substantially U-shaped connecting member 45 is located within the bifurcated end of beam 48 and has spaced walls which receive the end of beam 47, these spaced walls as well as those of beam 48 and the end of beam 47 being respectively formed with aligned openings which receive the pivot pin 50. The U-shaped member 45 is formed at its face which extends between its spaced walls with an elongated recess receiving a reduced end 47a of beam 47, this recess providing stops 51 and 51a on the member 45, as indicated in FIG. 16. The side walls of the member 45 are further formed with pairs of aligned openings 46 one set of which may receive an elongated wedge member 49, as indicated in FIG. 16. This wedge member 49 is located beyond the bottom face of beam 48 and engages its bottom face while the narrowed end 47a of beam 47 engages the stop 51 to lock the beams in a desired angular position. The wedge member 49 may be driven through the openings of member 45 to an extent which determines the angular position between the beams.

Figure 17:
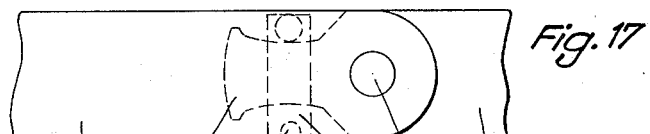
FIG. 17 is a fragmentary side elevational view of still another embodiment of the present invention.

The embodiment of FIG. 17 includes a beam 53 having a bifurcated end portion provided with spaced walls between which an end of beam 52 extends, the beam 52 and the spaced walls respectively being formed with aligned openings which receive the pivot pin 54. The end 52a of beam 52 has considerable clearance between the spaced walls at the end of beam 53 and a U-shaped member 55 hangs downwardly from the end 52a of member 52 at substantially right angles thereto, as indicated in FIG. 17. The U-shaped member 55 has spaced side walls between which the end 52a extends and member 55 is itself located between the side walls at the end of beam 53 and extends downwardly beyond beam 53 as indicated in FIG. 17. The spaced side walls of member 55 are formed with openings 56 which also extend downwardly beyond beam 53 and through which a wedge member 57 extends so that this wedge member determines the angular position of beams 52 and 53, wedge member 57 engaging the bottom face of the beam 53.

The embodiment of the invention which is shown in FIG. 18 includes a beam 60 having a bifurcated end portion provided with spaced walls between which an end portion of beam 59 extends, this latter end portion and the spaced walls of beam 60 being respectively formed with aligned openings which receive the pivot pin 61. The end face of beam 59 is V-shaped, so that the embodiment of FIG. 18 is similar to that of FIG. 3. However, instead of being provided with a pair of openings which receive the wedge member, the spaced walls at the end of beam 60 are respectively formed with a pair of aligned openings which turnably carry a member 62 having between these spaced walls an eccentric portion, shown in dotted lines in FIG. 18, which engages an inclined face of beam 59 to determine the angular position between beams 59 and 60. The member 62 has a non-circular end portion so that member 62 may be turned with a suitable wrench and by such turning the angular position of the eccentric is changed to regulate the angle between beams 59 and 60.

One of the advantages of the arrangement of FIG. 18 is that the eccentric located between the side walls of beam 60 cannot become lost since member 62 once mounted on the beam 60 cannot be removed therefrom. This member 62 can be made up of separate interconnected elements. The use of wedge members provides the advantage of providing a superior engagement between the wedge members and the surfaces cooperating therewith.

According to the embodiment of FIG. 19 the beam 64 has a bifurcated end portion provided with spaced walls between which an end portion of beam 63 extends, this latter end portion and spaced walls being formed with aligned openings, respectively, which receive the pivot pin 65. Furthermore, this end portion and spaced walls are formed with an additional set of aligned openings, respectively, through which a pair of wedge members 66a and 66b extend. Together these wedge members provide a substantially circular cross section, as indicated in FIG. 19. These wedge members are driven through the aligned openings from opposite sides and serve to lock the beams in a desired angular position.

The embodiment of FIG. 20 includes a beam 69 having a bifurcated end portion provided with spaced walls between which an end portion of beam 68 extends, these spaced walls and beam 68 being formed with aligned openings which receive the pivot pin 66. Furthermore, these spaced walls and the end portion of beam 68 are formed respectively with aligned substantially rectangular openings which receive the wedge members 70 and 71. These wedge members are of substantially rectangular cross section and extend at right angles to each other, as indicated in FIG. 20, wedge member 70 riding in a groove of wedge member 71 in a manner indicated in FIG. 20. Wedge members 70 and 71 are driven into the openings from opposite sides of the beams in the same way as wedge members 66a and 66b.

FIGS. 21 and 22 show an embodiment where the beam 80 is provided with a bifurcated end portion having spaced walls between which an end portion of the beam 79 extends. These spaced walls and the end portion of beam 79 are respectively formed with two pairs of aligned openings, as indicated most clearly in FIG. 22, the openings of the beam 79 being larger than those of beam 80, as is evident from FIG. 21. Elongated members 81 and 82 respectively extend through the two sets of aligned openings and are turnably carried by the beam 80. These members 81 and 82 having eccentric projections in the openings of beam 79, respectively, which engage this beam 79. Of course, members 81 and 82 are composed of several interconnected elements. The members 81 and 82 having non-circular, free end portions 81a and 82a, respectively, which extend respectively through mating non-circular openings of a pair of cranks to which a pair of nuts are pivotally connected, these nuts being threaded oppositely from each other and respectively being in threaded engagement with oppositely threaded portions of a screw member 83 having non-circular end portions, as indicated in FIGS. 21 and 22. Thus, when the screw member 83 is turned about its axis the members 81 and 82 turn in opposite directions in order to turn beams 79 and 80 with respect to each other as well as to hold these beams in the angular position to which they are turned.

Figure 24:
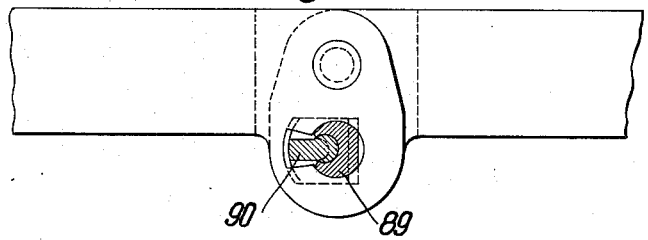
FIG. 24 is a fragmentary side elevational view of yet another embodiment of the present invention.

The embodiment of FIG. 23 is similar to that of FIG. 7 except that the openings which receive the wedge members are out of line with the pivot pin. As shown in FIG. 23 the beam 88 has a bifurcated end portion provided with spaced walls between which the end of beam 87 extends, the latter beam and the latter spaced walls respectively being formed with aligned openings which receive the pivot pin 86. Furthermore, these spaced walls and the end of beam 87 are formed respectively with two additional sets of aligned openings so that the beams have three sets of aligned openings respectively located at the corners of a triangle. Wedge members 84 and 85 extend through the two sets of aligned openings, respectively, located below the pivot pin 86. It will be noted from FIG. 23 that the openings of beam 87 through which the wedge members extend are larger and of a different configuration than the beam 88. With the arrangement of FIG. 23 the pivot pin 86 is stressed to a smaller extent than the pivot pin of FIG. 7. However, the ends of the beams are extended downwardly as shown in FIG. 23, and it is not possible with the embodiment of FIG. 3 to use the beams in an inverted position from that shown in FIG. 23. The same is true of the embodiment of FIG. 24 which is identical with that of FIG. 23 except that instead of two sets of openings to receive a pair of wedge members, the beam received between the spaced walls of the bifurcated end portion is formed with an opening similar to those of beam 87, while the spaced walls of the bifurcated end portion of the left beam of FIG. 24 are each formed with an opening having a substantially keyhole shape. A pair of wedge members 89 and 90 extend through the keyhole openings and the aligned opening of the right beam of FIG. 24, wedge member 90 riding in a groove of wedge member 89, and these wedge members being driven into the openings from opposite sides. It will be noted that the embodiments of FIGS. 23 and 24 also lock the beams in a given angular position.

Figure 25:
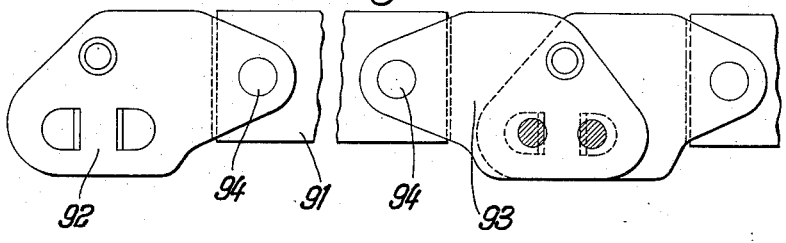
FIG. 25 is a fragmentary side elevational view of an embodiment of the invention similar to FIG. 23 showing a beam made up of separate elements connected together.

As was pointed out above, it is not practical to invert the embodiment of FIG. 23 because the downwardly extending end portions of the beams of FIG. 23 would then extend upwardly in an undesirable manner. FIG. 25 shows an embodiment identical with that of FIG. 23 to permit the beams 91 to be inverted, if desired. This result is obtained by providing the beams 91 with removably connected end portions 92 and 93. These end portions are provided with bifurcated ends which receive the ends of the beam 91 to serve as end portions therefor, pins 94 interconnecting end portions 92 and 93 to the beam 91 so that if desired the pins 94 may be removed and the beams 91 inverted and reconnected to the end portions 92 and 93. Otherwise, the embodiment of FIG. 25 is identical to that of FIG. 23. Furthermore, with the embodiment of FIG. 24 it is possible to make elements 92 and 93 of a strong metal such as steel while the beam 91 may be made of a light metal. With all of the above-described embodiments, the beams may be made of any desired metal.

Figure 26:
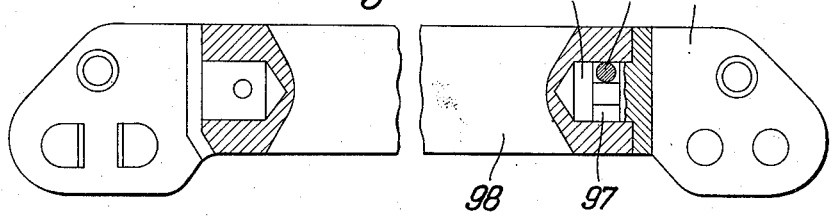
FIG. 26 illustrates in detail the manner in which parts of a beam of the type shown in FIG. 25 may be interconnected.

A further manner of interconnecting end portions to a beam in a removable manner is indicated in FIG. 26 where the beam 98 is provided at each end with a cylindrical bore receiving a cylindrical projection 96 of an end portion 95 identical with the end portion 93 of FIG. 25 insofar as the openings are concerned. This cylindrical portion 96 is formed with an annular groove 97 and a pin 99 extends through suitable bores of beam 98 and into the groove 97 so that with the arrangement of FIG. 26 the beam 98 is turnable about its axis with respect to member 95.

Figure 27:
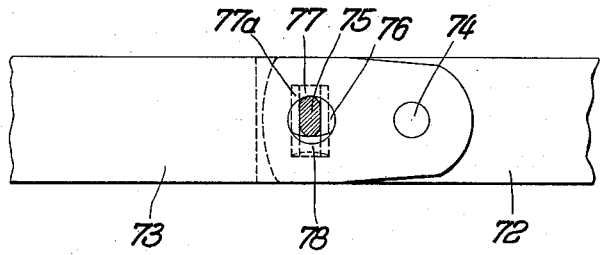
FIG. 27 is a fragmentary side elevational view of a further embodiment of the present invention.

FIG. 27 shows an arrangement where the beam 73 is provided with a bifurcated end portion having spaced walls into which an end portion of the beam 72 extends, these spaced walls and the beam 72 being respectively formed with aligned openings which receive the pivot pin 74. The spaced walls at the end of beam 73 are further formed with a pair of aligned openings 76 through which a wedge member 75 extends. The beam 72 is formed with an elongated opening 77 overlapping and extending beyond the openings 76 and provided with elongated projections 77a of substantially V-shaped cross section, for example. A block 78 is located in opening 77 and is provided with grooves which receive the projections 77a, block 78 being made of two interconnected parts. Thus, the block 78 is slidable along the opening 77, and it will be seen that the wedge member 75 engages the block 78 as well as the beam 73 to lock the beams in a desired angular position with respect to each other. With this arrangement, if the beam 72 is inverted the block 78 will simply fall to the bottom end of opening 77 and the beam 72 can then be re-assembled with beam 73 and the parts will again have the arrangement shown in FIG. 27.

Figure 28:
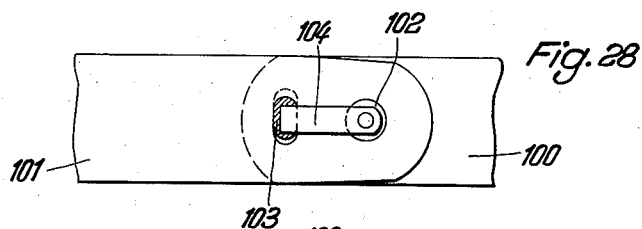
FIG. 28 is a fragmentary side elevational view of still another embodiment of the present invention.

FIG. 28 shows an embodiment where the beam 100 has an end portion extending between the spaced walls of the bifurcated end of beam 101, beam 100 and these spaced walls being formed with one set of aligned openings, respectively, which receive pivot pin 102 and with another set of aligned openings, respectively, which receive the wedge member 103. A strap 104 is fixed to members 102 and 103 so that these members are interconnected by the strap 104 so that with the embodiment of FIG. 24 the wedge member cannot become separated from the pivot pin 102.

Figure 29:
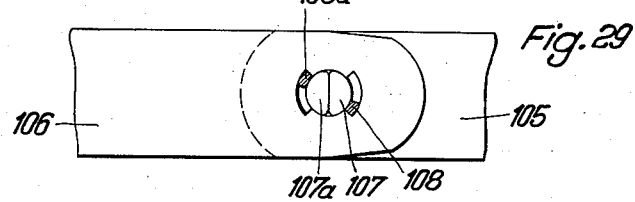
FIG. 29 is a fragmentary side elevational view of yet another embodiment of the present invention.

FIG. 29 shows an embodiment where the beam 105 has an end portion extending between the spaced side walls of the bifurcated end of beam 106. These spaced walls of the beam 105 are formed with a set of aligned openings, respectively, which receive a pivot pin made up of two pin portions 107 and 107a, as indicated in FIG. 29. The opening of the spaced walls at the end of beam 106 which receives the pivot pin portions 107 and 107a are provided with arcuate extensions, as indicated in FIG. 29, while the corresponding opening of beam 105 is also formed with a pair of arcuate extensions which are, however, shorter than those of the beam 106, as is evident from FIG. 29. Wedge member 108 is fixed to and forms an extension of pivot pin 107 and extends through one arcuate extension of beam 105 as well as through a pair of aligned arcuate extensions of the spaced walls of beam 106, while wedge member 108a is fixed to and forms a projection of pivot pin portion 107a and extends through the other set of arcuate extensions. The pivot pin portions and interconnecting wedge members are driven into the openings from opposite sides of the beams and the embodiment of FIG. 29 locks the wedge members together so that they cannot turn downwardly with respect to each other.

Figure 30:
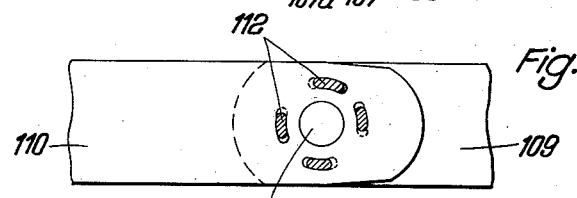
FIG. 30 is a fragmentary side elevational view of a further embodiment of the present invention.

In the embodiment of FIG. 30 the beam 110 is provided with a bifurcated end portion having spaced walls between which an end portion of the beam 109 extends, the latter end portion and the spaced walls being formed with aligned openings, respectively, which receive the pivot pin 111. These spaced walls and the beam 109 are further formed with four sets of aligned arcuate openings distributed about pivot pin 111, as indicated in FIG. 30, and respectively receiving four wedge members 112 which serve to lock the beams in a predetermined angular position. If desired, straps may interconnect pivot pin 111 with wedge members 112.

Figure 31:
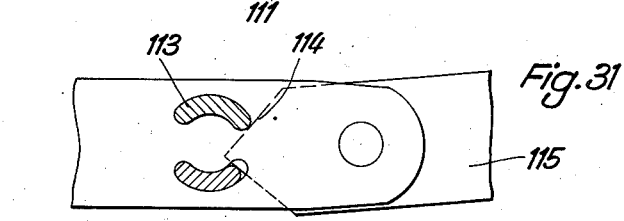
FIG. 31 is a fragmentary side elevational view of yet another embodiment of the present invention.

In order to prevent undesired distortion of the wedge members in a vertical direction as well as to assure a proper engagement between the wedge members and the surfaces cooperating therewith, an arrangement as shown in FIG. 31 may be used. According to FIG. 31 the beam 115 has a V-shaped end face 114 and extends between the spaced walls of the bifurcated end portion of the other beam, these beams being pivotally interconnected in the same way as the embodiment of FIG. 3. The left beam of FIG. 31 is formed in each of the spaced walls of its bifurcated end portion with a pair of elongated arcuate openings, as indicated in FIG. 31, and these arcuate openings receive channel-shaped wedge members 113 which engage the oppositely inclined face portions of the end face 114 in the manner indicated in FIG. 31 to lock the beams in a desired angular position.

Figure 32:
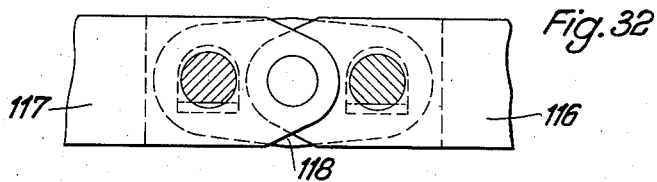
FIG. 32 is a fragmentary side elevational view of one more embodiment of the present invention.
Figure 33:
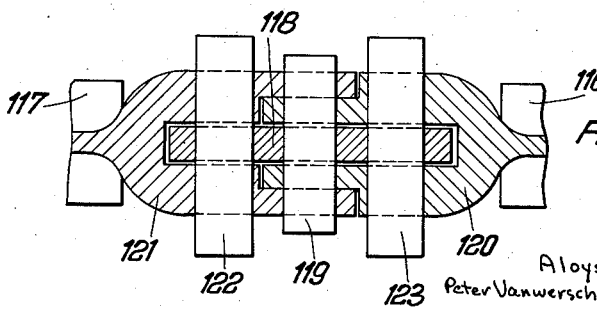
FIG. 33 is a sectional plan view of the structure of FIG. 32 taken along a horizontal plane midway between the top and bottom of FIG. 32.

The embodiment of FIGS. 32 and 33 is similar to that of FIG. 7 but differs therefrom in that it enables both beams or elongated members 116 and 117 to turn with respect to an elongated connecting member 118 in the form of a simple plate. Both of the beams 116 and 117 are provided with bifurcated end portions 120 and 121, respectively, these bifurcated end portions overlapping each other as indicated in FIG. 33 and being formed with aligned openings aligned with a substantially central opening of plate 118 to receive the pivot pin 119. End portion 120 of beam 116 is further formed with a pair of aligned openings aligned with an additional opening of plate 118 to receive the wedge member 123, while the end portion 121 of beam 117 is also formed with an additional pair of aligned openings aligned with another opening of plate 118 to receive the wedge member 122 so that the embodiment of FIGS. 32 and 33 operates in a manner similar to the embodiment of FIG. 7 to lock the beams in a given angular position.

It will be understood that each of the elements described above, or two or more together, may also find a useful application in other types of supporting structures differing from the types described above.

While the invention has been illustrated and described as embodied in pivotally interconnected beams of a supporting structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly consitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a supporting structure, in combination, a pair of elongated members having overlapping end portions each formed with a pair of openings passing therethrough, said openings in said respective end portions being simultaneously alignable so as to form two continuous substantially straight passages through said end portions, said passages being defined by respective faces of said end portions in said openings; pivot means interconnecting said end portions of said pair of elongated members so that the latter are turnable with respect to each other, the portions of said faces extending radially with respect to said pivot means so arranged that one of said passages is limited in a clockwise direction relative to said pivot means by a radially extending face of one of said end portions, and in a counterclockwise direction by a radially extending face of the other one of said end portions, and the other one of said passages is limited in a clockwise direction by a radially extending face of the other one of said end portions and in a counterclockwise direction by a radially extending face of said one end portion; and means interposed between said radially extending faces in each of said passages for holding said faces at predetermined respective distances.

2. In a supporting structure, in combination, a pair of elongated members having overlapping end portions each formed with a pair of openings passing therethrough, said openings in said respective end portions being simultaneously alignable so as to form two continuous substantially straight passages through said end portions, said passages being defined by respective faces of said end portions in said openings; pivot means interconnecting said end portions of said pair of elongated members so that the latter are turnable with respect to each other, the portions of said faces extending radially with respect to said pivot means being so arranged that one of said passages is limited in a clockwise direction relative to said pivot means by a radially extending face of one of said end portions, and in a counterclockwise direction by a radially extending face of the other one of said end portions, and the other one of said passages is limited in a clockwise direction by a radially extending face of the other one of said end portions and in a counterclockwise direction by a radially extending face of said one end portion; and wedge means interposed between said radially extending faces in each of said passages for holding said faces at predetermined respective distances.

3. In a supporting structure, in combination, a pair of elongated members having overlapping end portions, the end portion of one of said elongated members being bifurcated so as to form a pair of spaced walls, the end portion of the other one of said elongated members extending between said spaced walls, each of said end portions being formed with a pair of openings passing therethrough, said openings in said respective end portions being simultaneously alignable so as to form two continuous substantially straight passages through said end portions, said passages being defined by respective faces of said end portions in said openings; pivot means interconnecting said end portions of said pair of elongated member so that the latter are turnable with respect to each other, the portions of said faces extending radially with respect to said pivot means being so arranged that one of said passages is limited in a clockwise direction relative to said pivot means by a radially extending face of one of said end portions, and in a counterclockwise direction by a radially extending face of the other one of said end portions, and the other one of said passages is limited in a clockwise direction by a radially extending face of the other one of said end portions and in a counterclockwise direction by a radially extending face of said one end portion; and wedge means interposed between said radially extending faces in each of said passages for holding said faces at predetermined respective distances.

4. In a supporting structure, in combination, a pair of elongated members having overlapping end portions each formed with three openings passing therethrough, said openings in said respective end portions being simultaneously alignable so as to form three continuous substantially straight passages through said end portions, said passages being defined by respective faces of said end portions in said openings; pivot means in one of said passages for interconnecting said end portions of said pair of elongated members so that the latter are turnable with respect to each other, the portions of said faces in the other two of said passages extending radially with respect to said pivot means being so arranged that one of said two passages is limited in a clockwise direction relative to said pivot means by a radially extending face of one of said end portions, and in a counterclockwise direction by a radially extending face of the other one of said end portions, and the other one of said two passages is limited in a clockwise direction by a radially extending face of the other one of said end portions and in a counterclockwise direction by a radially extending face of said one end portion; and means interposed between said radially extending faces in each of said two passages for holding said faces in said two passages at predetermined respective distances.

5. In a supporting structure as set forth in claim 1, one of said pair of elongated members having another end portion spaced from said overlapping end portion and having a transverse opening formed therein; a third elongated member having a transverse opening aligned with said transverse opening in said other end portion; and a wedge member extending through said aligned transverse openings in wedging engagement with said one of said pair of elongated members and said third elongated member.

6. In a supporting structure, in combination, a pair of elongated beams having end portions adjacent to each other; a connecting member for connecting said beam end portions, said connecting member having a pair of opposite end portions, the pair of end portions of said connecting member and the pair of said beam end portions respectively overlapping each other; pivot means interconnecting one of said overlapping pairs of end portions so that one of said elongated beams is turnable with respect to said connecting member and means for securing the other of said overlapping pairs of end portions fixedly to each other so that the other of said elongated beams is in fixed position to said connecting member, said one pair of overlapping end portions being formed with a pair of openings passing thereto, said openings in said one pair of overlapping end portions being simultaneously alignable so as to form two continuous substantially straight passages through said end portions, said passages being defined by respective faces of said end portions in said openings, the portion of said faces extending radially with respect to said pivot means being so arranged that one of said passages is limited in a clockwise direction relative to said pivot means by a radially extending face of one of said end portions of said one overlapping pair of end portions and in a counterclockwise direction by a radially extending face of the other one of said end portions, and the other one of said passages is limited in a clockwise direction by a radially extending face of the other one of said end portions and in a counterclockwise direction by a radially extending face of said one end portion; and means interposed between said radially extending faces in each of said passages for holding said faces at predetermined respective distances.

7. In a supporting structure, in combination, a pair of elongated beams having end portions adjacent to each other; a connecting member for connecting said beam end portions, said connecting member having a pair of opposite end portions, the pair of end portions of said connecting member and the pair of said beam end portions respectively overlapping each other, one of said pairs of end portions being bifurcated and the other of said pairs of end portions being located between said bifurcated pair of end portions; pivot means interconnecting one of said overlapping pairs of end portions so that one of said elongated beams is turnable with respect to said connecting member and means for securing the other of said overlapping pairs of end portions fixedly to each other so that the other of said elongated beams is in fixed position to said connecting member, said one pair of overlapping end portions being formed with a pair of openings passing thereto, said openings in said one pair of overlapping end portions being simultaneously alignable so as to form two continuous substantially straight passages through said end portions, said passages being defined by respective faces of said end portions in said openings, the portion of said faces extending radially with respect to said pivot means being so arranged that one of said passages is limited in a clockwise direction relative to said pivot means by a radially extending face of one of said end portions of said one overlapping pair of end portions and in a counterclockwise direction by a radially extending face of the other one of said end portions, and the other one of said passages is limited in a clockwise direction by a radially extending face of the other one of said end portions and in a counterclockwise direction by a radially extending face of said one end portion; and means interposed between said radially extending faces in each of said passages for holding said faces at predetermined respective distances.

References Cited in the file of this patent

UNITED STATES PATENTS

| 1,275,457 | Martin | Aug. 13, 1918 |
| 2,554,210 | Pierre | May 22, 1951 |

FOREIGN PATENTS

| 70,945 | Netherlands | Oct. 15, 1952 |
| 74,988 | Netherlands | June 15, 1954 |
| 502,749 | Belgium | May 15, 1951 |
| 827,050 | Germany | Jan. 7, 1952 |
| 1,009,905 | France | Mar. 12, 1952 |